United States Patent Office 2,867,461
Patented Jan. 6, 1959

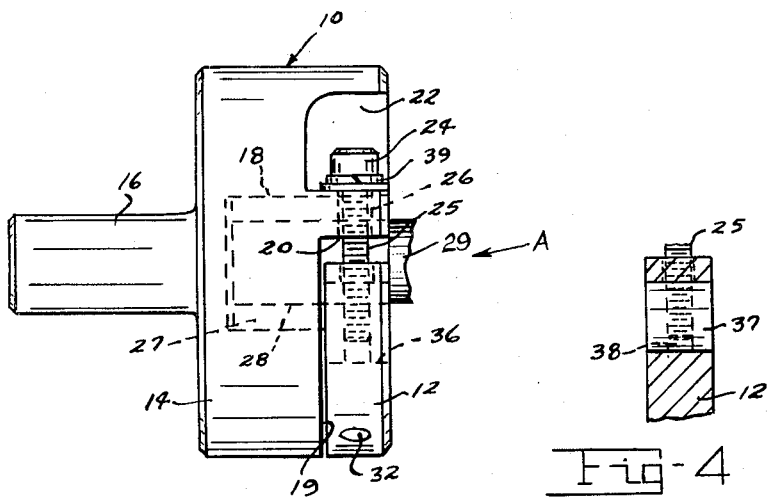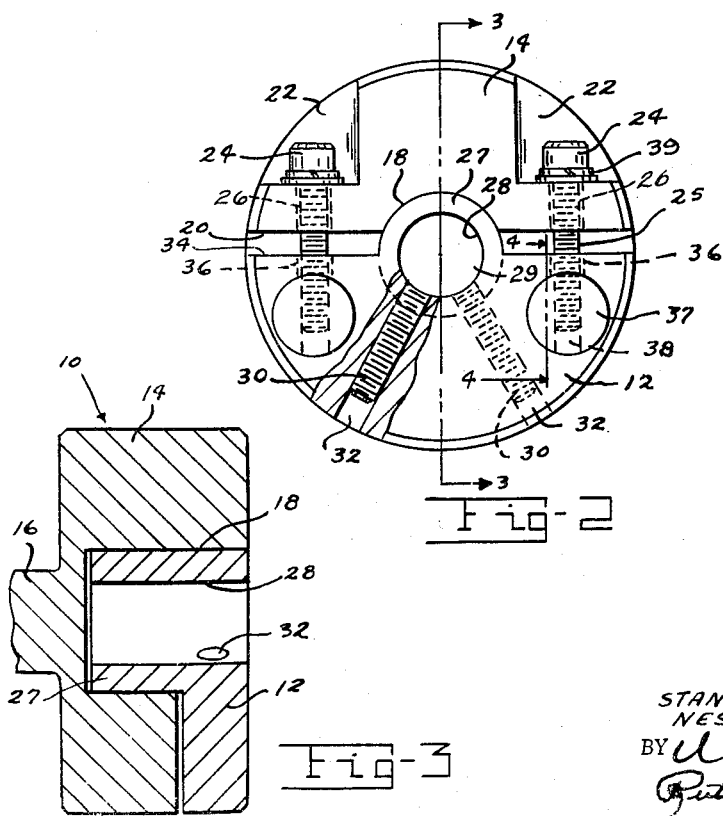

2,867,461

ADJUSTABLE LOCKING COUPLING

Stanley Kahn, West Newton, and Nesbit L. Duncan, Belmont, Mass., assignors to the United States of America as represented by the Secretary of the Air Force Application December 5, 1957, Serial No. 700,922

4 Claims. (Cl. 287—119)

The present invention relates to a coupling between two inline rotary shafts and, more particularly, to a coupling which carries means for adjusting the angular or phase relationship between a pair of inline rotary shafts, thereby insuring proper phase adjustment.

In the field of mechanics there exists a need for a positive locking yet adjustable coupling permitting the transfer of power from one shaft to another with precise angular relationship. This need was felt when two analyzers were required to be clamped together with precise angular alignment. No available coupling existed that would permit this type of operation.

Prior art included many types of coupling but each required trial and error methods of adjustment and did not permit the fine adjustments required.

The object of the invention is the provision of a device fulfilling these requirements.

A further object of the invention is the provision of a coupling between two inline rotary shafts which is provided with manual means for effecting precise annular alignment or inphase relationship.

A further object of the invention is the provision of a coupling element provided with means for effecting alignment of two rotary inline shafts which means also serves as positive connection between the shafts.

A further object of the invention is the provision of a device for connecting and securing alignment or adjusted inphase relationship between two rotary shafts and locking the coupling in this position wherein the means for securing the adjustment, and the locking means lie wholly within the circumferential area of the device and are accessible from its exterior.

Other objects and advantages of the invention will become apparent as the description proceeds.

In the drawings:

Fig. 1 is a side elevation of the coupling showing certain interior elements in dotted lines;

Fig. 2 is an end elevation looking in the direction indicated by the arrow A in Fig. 1, and having a portion shown in cross section.

Fig. 3 is a vertical longitudinal cross section taken on the line 3—3 of Fig. 2; and Fig. 4 is a detailed cross sectional view of the plug pivot taken on the line 4—4 of Fig. 2.

Referring more in detail to the drawings, the coupling is made up of a first coupling member 10 and a second coupling member 12 which have sliding and overlapping connection, and which form together a cylinder unit. The first coupling member 10 has a barrel portion 14 and a shank 16. The shank 16 is that part of the member 10 which has adjustable and rigid connection with a drive shaft (not shown). The barrel portion 14 is provided with a centered bore 18 shown in Fig. 3 and shown in dotted lines in Fig. 1.

A section of the barrel portion is cut away, forming a recess greater in extent than a semicylinder, extending a distance beyond the diameter of the coupling and forming surfaces 19 and 20, respectively normal to and parallel with, the axis of the coupling. A portion of the bore 18 forms a bearing surface, which fits over and mates with a complementary portion of the element 12, later described.

The barrel 14 is also provided with a pair of recesses 22, cut in from the perimeter, for accommodating bolt heads 24 of threaded bolts 25. A pair of smooth unthreaded bores 26 open to the recesses 22 at one end, and to the surface 20 at the other end. The bolts 25 are received in these openings with a small amount of play.

The second coupling member 12 is substantially semicylindrical in shape, and is provided with a hollow shank 27. The shank 27 telescopes into the cylindrical bore 18 in the barrel portion 14, and provides a rotary bearing surface.

The second, or driven shaft 29, extends into a central bore 28 and is rigidly secured by means of radially extending set screws 30 accommodated in the radial screw threaded bores 32.

It will be seen that the edge portion 34 of the member 12 lies in the diameter of the coupling, and its projection passes through the axis of the shaft. The cutaway portion in the member 14 is more than a half cylinder, i. e., the sections of the wall 20 lie in a cord which is less than a diameter. A space is thus provided between the members 12 and 14.

Smooth, unthreaded bores 26 and 36 receive the bolts 25 with a small amount of play. A pair of cylindrical openings in the element 12, extending normally to the axis of the cylinder unit and on opposite sides of said axis receive plug pivots 37. These plug pivots are provided with screw threaded bores 38 for threadedly receiving bolts 25. Each bolt 25 is provided with a spring washer 39 for locking.

It will be seen that set screws 30 are inserted from the circumference of the coupling and may be reached from the exterior, but do not form protuberances or interfere with the smooth surface of the coupling. Their function is to provide positive means for securing the second or driven shaft (not shown) rigidly to the element 12.

In operation of the device, angular or phase adjustment between the two coupled shafts is secured by tightening one of the screws or bolts 25 and loosening the other. The borings 26 and 36, and the slight play possible in the plug pivots 37 allow for an adjustment of the order of 7°.

In the device for which the coupling was built, the adjustment was made by tightening to a temporary position and running the machine to measure the error. A trial adjustment was made and the machine run again to determine if the error had been fully corrected. Any error remaining was removed by alternately resetting and running until the position was within the allowable limit.

While the invention is shown and described in connection with one form for illustrative, rather than restrictive purposes, it is obvious that changes and modifications may be made by those skilled in the art without departing from the scope and spirit of the invention as defined in the accompanying claims.

We claim:

1. An adjustable coupling between two inline rotary shafts comprising a first member and a second member, telescoping and rotary movable portions on said first and second members, said first member adapted to be rigidly attached to a drive shaft, means on said second member for rigidly attaching said second member to a driven shaft, means for securing phase adjustment between said drive shaft and said driven shaft comprising a pair of threaded bolts securing said first and second members together, said bolts being positioned normal to the axis of said coupling, on opposite sides thereof and spaced a distance therefrom, smooth surfaced bores on said first and second members for receiving said bolts with an amount of play, plug pivots received in axially extending openings in said second member, said plug pivots having threaded bores for threadedly receiving said bolts whereby relative rotary movement between said first and second members may be obtained to secure inphase alignment by tightening one of said bolts and loosening the other.

2. A coupling member between two inline rotary shafts comprising a first member having rigid connection with one of said shafts, a second member having rigid connection with the other of said shafts, said first member being provided with a central axial cup-shaped bore, a shank in said second member fitting into said bore, a substantially semicylindrical recess at the inner end of said first member for receiving said second member in spaced overlapping relationship, a pair of bolts for securing said first and second members together, said bolts being positioned on either side of the axis of said shafts and received in axially extending smooth bores in each of said first and second members, plug pivots in said second member threadedly receiving said bolts so that an amount of rotary movement of the order of ±7° may be obtained by tightening one bolt and loosening the other.

3. In a coupling for adjusting the phase relationship of two in-line shafts, a unit substantially of the form of a cylinder comprising a first member and a second member, means on said first member for attachment to one of said shafts, said first member being provided with a cup-shaped axially extending cylindrical recess, a bored cylindrical portion on said second member for rotatably fitting into said cup-shaped recess for closely accommodating the other of said shafts in the bore thereof, means on said second member for securing said second member to said other shaft, said first member having a cut away portion whose walls are respectively parallel and normal to the axis of said shafts and cylinder, the extent of said recess being greater than a semicircular segment, a segment on said second member fitting into said cut away portion to complete the cylindrical formation of said unit, the limiting cord of said segment being a diameter, allowance thereby being made for substantial play for rotary movement between said first member and said second member, a pair of plug pivots fitting into axially extending recesses in said second member, said first and second members being provided with aligned openings extending normally to the axis of said cylinder and on opposite sides of said axis, a pair of bolts, each of said bolts engaging loosely in an opening in said first member and an aligned opening in said second member, and threadedly engaging a threaded opening in one of said plug pivots, to hold said first and second members together and provide phase adjustment between said shafts when one of said bolts is loosened and the other is tightened.

4. In a coupling for adjusting the phase relationship of two in-line shafts, a unit of substantial cylindrical form comprising a first member having a cup shaped cylindrical recess therein and a second member having a bored concentric cylindrical portion telescoping within the cylindrical recess of said first member and rotatable therein, means for rigidly attaching said first member to one of said shafts, the other of said shafts extending within the bore of said second member and rigidly attached thereto, said first member having a cut-away segment extending throughout a portion only of its length, and greater than a radius in width, said second member having a semicircular segmental portion, said segmental portion fitting into the cut-away segment of said first member and spaced from said first member in the region of the diameter of said cylinder, a pair of plug pivots fitted into axially extending openings in said second member, a pair of bolts positioned on opposite sides of the center of said cylinder and normal to its axis fitting through unthreaded openings in said first member and aligned unthreaded openings in said second member and threadedly engaging threaded openings in said plug pivots, so that phase relationship between said shafts may be gradually modified by the tightening of one bolt and the loosening of the other.

References Cited in the file of this patent

UNITED STATES PATENTS

| | | |
|---|---|---|
| 1,307,160 | Stokes | June 17, 1919 |
| 1,556,737 | Wilson | Oct. 13, 1925 |
| 2,250,448 | Edwards | July 29, 1941 |
| 2,530,290 | Collins | Nov. 14, 1950 |